United States Patent
Pan et al.

(10) Patent No.: US 12,388,263 B2
(45) Date of Patent: Aug. 12, 2025

(54) METHODS FOR SECURED CAPACITOR BANK CONTROL OF SERIES-COMPENSATED TRANSMISSION LINE

(71) Applicant: Hitachi Energy USA Inc., Raleigh, NC (US)

(72) Inventors: Jiuping Pan, Raleigh, NC (US); Reynaldo Nuqui, Cary, NC (US); Liqi Zhang, Apex, NC (US); Anil Kondabathini, Apex, NC (US); HyoJong Lee, Raleigh, NC (US)

(73) Assignee: Hitachi Energy USA Inc., Raleigh, NC (US)

( * ) Notice: Subject to any disclaimer, the term of this patent is extended or adjusted under 35 U.S.C. 154(b) by 312 days.

(21) Appl. No.: 17/902,792

(22) Filed: Sep. 2, 2022

(65) Prior Publication Data

US 2024/0079878 A1    Mar. 7, 2024

(51) Int. Cl.
*H02J 3/28*     (2006.01)
*H02J 3/00*     (2006.01)
*H02J 13/00*    (2006.01)

(52) U.S. Cl.
CPC .............. *H02J 3/28* (2013.01); *H02J 3/0012* (2020.01); *H02J 3/00125* (2020.01);
(Continued)

(58) Field of Classification Search
CPC ........ H02J 3/28; H02J 3/0012; H02J 3/00125; H02J 13/00022; H02J 13/0004; H02J 2207/50
See application file for complete search history.

(56) References Cited

U.S. PATENT DOCUMENTS 9,621,569 B1    4/2017    McEachern et al.
9,806,690 B1 *  10/2017   Gong ..................... F03D 9/257
(Continued)

FOREIGN PATENT DOCUMENTS

BR    102014004682 A2    2/2016
CN    105633978 A        6/2016
WO    2022028487 A1      2/2022

OTHER PUBLICATIONS

Extended European Search Report received in EP Application No. 22216252.1, mailed Sep. 14, 2023, 5 pages.
(Continued)

*Primary Examiner* — Rexford N Barnie
*Assistant Examiner* — Thai H Tran
(74) *Attorney, Agent, or Firm* — Procopio, Cory, Hargreaves & Savitch LLP

(57) ABSTRACT

Power systems, such as transmission systems, may comprise a series capacitor bank (SCB) to provide series compensation on a power line. The SCB may be electrically inserted into the power line or bypassed according to commands sent by remote systems. Such commands may be compromised in a cyberattack to cause deteriorated conditions and instability in the power system. Thus, according to an embodiment, a protection layer is provided in an SCB station to intercept commands prior to execution, assess the consistency of the commands with a physical state of the power system, and either allow or block the commands based on the assessment, to thereby protect the SCB from cyberattacks.

19 Claims, 8 Drawing Sheets

(52) U.S. Cl.
CPC .... *H02J 13/00022* (2020.01); *H02J 13/0004* (2020.01); *H02J 2207/50* (2020.01)

(56) References Cited

U.S. PATENT DOCUMENTS

2016/0320785 A1* 11/2016 Kondabathini ......... G05F 1/625
2019/0089722 A1    3/2019 Ciocarlie et al.

OTHER PUBLICATIONS

Bui-Van et al., "Control of Switching Overvoltages and Transient Recovery Voltages for Hydro-Québec 735-kV Series-Compensated Transmission System", International Conference on Power Systems Transients (IPST'07) in Lyon, France, Jun. 4-7, 2007, 6 pages.

McVey, "Transient Recovery Voltage (TRV) and Rate of Rise of Recovery Voltage (RRRV) of Line Circuit Breakers in Over Compensated Transmission Lines", International Council on Large Electric Systems, Cigre Gotf 2017, 19 pages.

WECC (Western Electricity Coordinating Council), Table, Major WECC Remedial Action Schemes (RAS) Used in Standard PRC-004-WECC-1, (Revised Sep. 19, 2007), 3 pages.

Chakrabarty et al., "Detection of Malicious Command Injection Attacks on Phase Shifter Control in Power Systems", IEEE Transactions on Power Systems, vol. 36, No. 1, Jan. 2021, p. 271-280.

Roberts et al., "Learning Behavior of Distribution System Discrete Control Devices for Cyber-Physical Security", IEEE Transactions on Smart Grid, vol. 11, No. 1, Jan. 2020, p. 749-761.

Xiang et al., "Power System Reliability Evaluation Considering Load Redistribution Attacks", DOI: 10.1109/TSG.2017.2569589, 2017 IEEE, 1949-3061.13 pages.

Bhusal et al., "Detection of Cyber Attacks on Voltage Regulation in Distribution Systems Using Machine Learning", IEEE Power & Energy Society Section, IEEE Access 2021, 3064689, DOI 10.1109, 15 pages.

* cited by examiner

METHODS FOR SECURED CAPACITOR BANK CONTROL OF SERIES-COMPENSATED TRANSMISSION LINE

GOVERNMENT LICENSE RIGHTS

This invention was made with U.S. Government support under Contract No. DE-OE00000897 awarded by the Department of Energy. The U.S. Government has certain rights in the invention.

BACKGROUND

Field of the Invention

The embodiments described herein are generally directed to control in a power system, and, more particularly, to secure control of a series capacitor bank (SCB) in a power line.

Description of the Related Art

A series capacitor bank (SCB) comprises a plurality of capacitors, electrically connected in series with each other to store electrical energy. SCBs are incorporated into alternating current (AC) power lines to improve the steady-state performance and dynamic characteristics of a power system. The maximum active power that is transferable over a power line is inversely proportional to the series inductive reactance of the power line. Thus, by compensating the series inductive reactance of the power line, typically between 25% and 70%, using an SCB, an electrically shorter power line can be realized and higher active power transfer and improved system dynamic performance can be achieved. In general, the main benefits of applying series compensation in transmission power systems include enhanced system dynamic stability, desirable load division among parallel lines, improved voltage regulation and reactive power balance, and reduced transmission losses.

Security against malicious control of SCBs is deemed critical. An attacker may gain access to the communication channels of the power system and initiate unauthorized control commands or alter control commands to manipulate SCB positions. For example, an attacker may issue malicious control commands to manipulate the SCB positions under normal conditions, block or compromise the control commands under abnormal (e.g., emergency) conditions, generate successive bypass and insertion commands to SCBs, and/or the like. Unauthorized or altered control commands may cause overloading on power lines, voltage violations, inter-area oscillations, reduced stability margin against contingencies, risk of system instability, and the like.

SUMMARY

It would be advantageous to protect a series capacitor bank (SCB) against malicious control. It would also be desirable to intercept commands prior to execution, assess them based on their consistency with a physical state of the power system, and either block or allow the command based on that assessment. It would be further advantageous to assess consistency based on the presence or absence of a line fault or other system disturbance, as well as to prevent successive switching of the SCB's state. Accordingly, to address one or more of these concerns, systems, methods, and non-transitory computer-readable media are disclosed for secure control of a series capacitor bank (SCB) in a power line.

In an embodiment, a method comprises using at least one hardware processor, within a controller of a series capacitor bank (SCB) station, to: receive a remote control signal from a system that is external to the SCB station, wherein the remote control signal represents a command to either electrically insert the SCB into a power line within a power system or bypass the SCB; assess whether or not the command is consistent with a physical state of the power system; when the command is inconsistent with the physical state of the power system, block execution of the command by the controller; and, when the command is consistent with the physical state of the power system, allow execution of the command by the controller.

The method may further comprise using the at least one hardware processor to, when the command is inconsistent with the physical state of the power system, initiate an alert to one or more recipients.

The method may further comprise using the at least one hardware processor to execute a line-fault detection (LFD) function that determines whether or not a line fault exists within a detection zone, wherein assessing whether or not the command is consistent with the physical state of the power system comprises: determining that the command is inconsistent with the physical state of the power system when the command is to bypass the SCB and is received while no line fault is determined to exist within the detection zone by the LFD function; and determining that the command is consistent with the physical state of the power system when the command is to bypass the SCB and is received while the line fault is determined to exist within the detection zone by the LFD function. The remote control signal may be received from a line protection system.

The method may further comprise using the at least one hardware processor to execute a system disturbance detection (SDD) function that determines whether or not a system disturbance exists within the power system, wherein assessing whether or not the command is consistent with the physical state of the power system comprises determining whether or not the command is consistent based on an existence or non-existence of the system disturbance, as determined by the SDD function, within a time window around receipt of the remote control signal.

The system disturbance may comprise an emergency power transfer, wherein determining whether or not the command is consistent based on the existence or non-existence of the system disturbance comprises: determining that the command is inconsistent when the command is to insert the SCB and no emergency power transfer is determined to exist by the SDD function within the time window; and determining that the command is consistent when the command is to insert the SCB and the emergency power transfer is determined to exist by the SDD function within the time window.

The system disturbance may comprise a frequency disturbance, wherein determining whether or not the command is consistent based on the existence or non-existence of the system disturbance comprises: determining that the command is inconsistent when the command is to one of insert the SCB or bypass the SCB and no frequency disturbance is determined to exist by the SDD function within the time window; and determining that the command is consistent when the command is to the other one of insert the SCB or bypass the SCB and the frequency disturbance is determined to exist by the SDD function within the time window.

The system disturbance may comprise an abnormal voltage, wherein determining whether or not the command is consistent based on the existence or non-existence of the system disturbance comprises: determining that the command is inconsistent when the command is to one of insert the SCB or bypass the SCB and no abnormal voltage is determined to exist by the SDD function within the time window; and determining that the command is consistent when the command is to the other one of insert the SCB or bypass the SCB and the abnormal voltage is determined to exist by the SDD function within the time window.

The remote control signal may be received from a remedial action schemes (RAS) system, an energy management system (EMS), or a wide-area monitoring, protection, and control (WAMPAC) system.

Assessing whether or not the command is consistent with the physical state of the power system may comprise: determining that the command is inconsistent with the physical state of the power system, when either the command is to insert the SCB and a present load of the transmission line is below a first threshold, or the command is to bypass the SCB and the present load of the transmission line exceeds a second threshold; and determining that the command is consistent with the physical state of the power system, when either the command is to insert the SCB and the present load of the transmission line exceeds the second threshold, or the command is to bypass the SCB and the present load of the transmission line is below the first threshold.

Assessing whether or not the command is consistent with the physical state of the power system may comprise determining that the command is inconsistent with the physical state of the power system when either: the command is to insert the SCB and is received within a time window from execution of a prior command to bypass the SCB; or the command is to bypass the SCB and is received within the time window from execution of a prior command to insert the SCB.

The method may further comprise using the at least one hardware processor to execute two or more of: a line fault detection (LFD) function that determines whether or not a line fault exists on the transmission line; a system disturbance detection (SDD) function that determines whether or not a system disturbance exists within the power system; or an interlocking schemes (IS) function that determines one or both of a load condition of the transmission line or whether or not a prior command has been executed within a time window preceding receipt of the remote control signal; wherein assessing whether or not the command is consistent with the physical state of the power system comprises executing logic that utilizes the determination by each of the two or more of the LFD function, the SDD function, and the IS function to determine whether or not the command is consistent with the physical state of the power system. The method may further comprise using the at least one hardware processor to: receive real-time measurements of the power system; and execute the two or more of the LFD function, the SDD function, or the IS function in real time using the real-time measurements as input. The logic may complete execution within 500 milliseconds of receiving the remote control signal.

The method may further comprise using the at least one hardware processor to: receive real-time measurements of the power system; and continually determine the physical state of the power system in real time based on the real-time measurements, wherein the assessment is performed each time a remote control signal is received.

The method may further comprise using the at least one hardware processor to, when execution of the command is allowed, controlling a bypass breaker of the SCB station according to the command. Controlling the bypass breaker may comprise: opening the bypass breaker when the command is to insert the SCB; and closing the bypass breaker when the command is to bypass the SCB.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as the controller of an SCB station, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for secure control of a series capacitor bank (SCB) in a power line. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
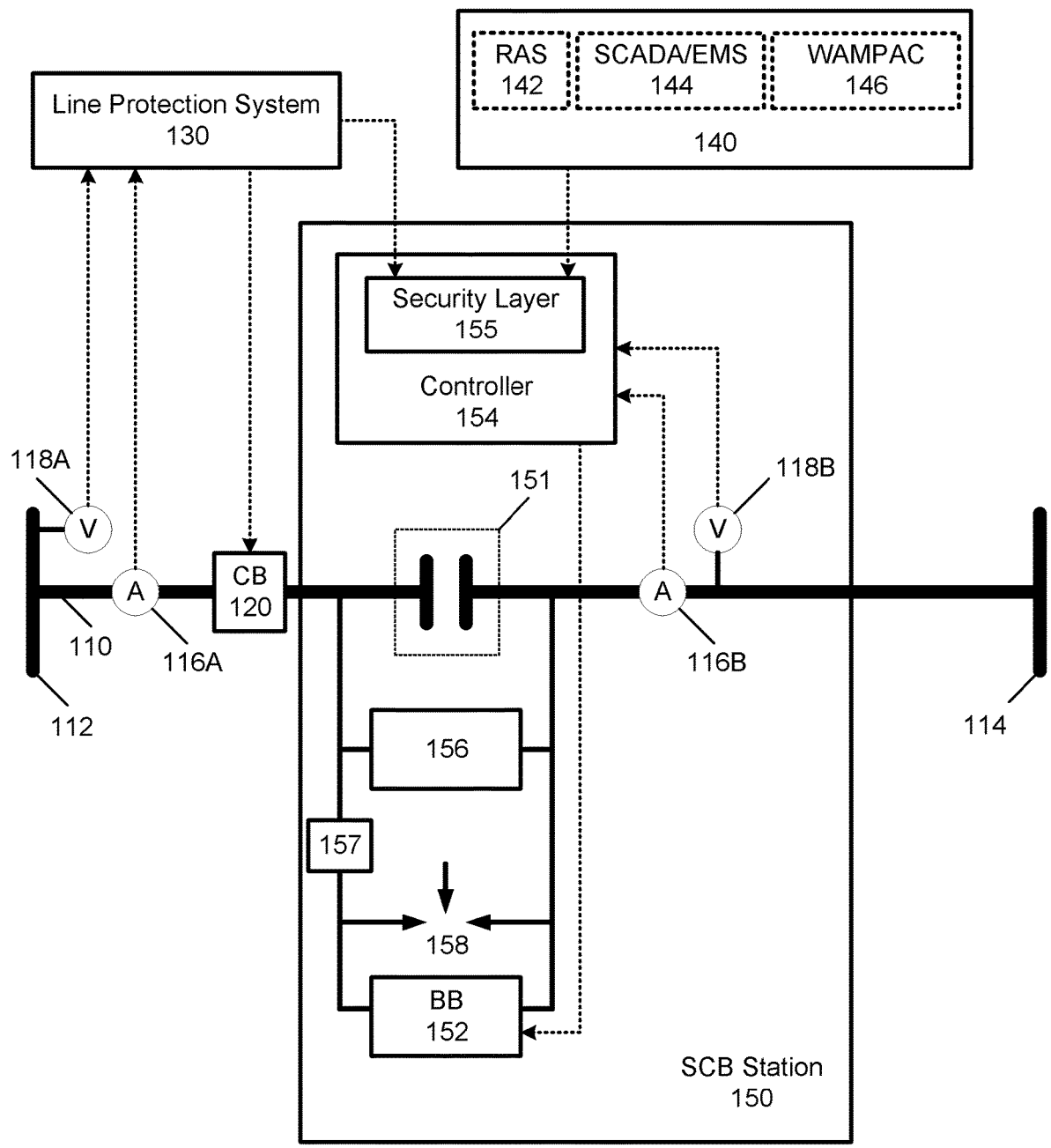
FIG. 1 illustrates a schematic of an example infrastructure in which one or more of the disclosed processes may be implemented, according to an embodiment.

FIG. 1 illustrates a schematic of an example infrastructure in which one or more of the disclosed processes may be implemented, according to an embodiment. It is generally contemplated that the disclosed embodiments will be performed in a power system 100, such as a power grid (e.g., at any scale, from a large-scale utility grid to a regional grid). Power system 100 may be any network of electrical components (e.g., power system equipment) configured to generate, store, supply, transmit, distribute, and/or consume electrical power, including, without limitation, power stations configured to produce electricity from combustible fuels (e.g., coal, natural gas, nuclear, etc.) and/or renewable resources (e.g., wind, solar, etc.), transmission systems configured to carry or transmit electricity from sources (e.g., generators, battery energy storage (BES) systems, etc.) to loads, and distribution systems configured to feed supplied electricity to nearby homes, businesses, and/or other establishments. However, disclosed embodiments will primarily be discussed and illustrated herein with respect to a transmission system.

Power system 100 comprises a power line 110. Power line 110 may be a transmission line that extends between a first substation bus 112 and a second substation bus 114. However, power line 110 could be any wire or other conductor that conducts electricity through a controllable SCB. Power line 110 may include one or more current measurement devices 116 (e.g., 116A and 116B) that measure current in power line 110 and one or more voltage measurement devices (e.g., 118A and 118B) that measure voltage in power line 110. Power line 110 may also include at least one circuit breaker 120.

Line protection system 130 may receive data reflecting information about power system 100, including current measurements from at least one current measurement device 116A and/or voltage measurements from at least one voltage measurement device 118A. Line protection system 130 may analyze the data in real-time, and control circuit breaker 120 based on the analysis of the data. In particular, line protection system 130 may trip (i.e., open) circuit breaker 120 in order to protect power line 110 when line protection system 130 detects a fault in power line 110 based on analysis of the data. It should be understood that a line fault may be any abnormal electric current in power line 110. In a three-phase power line 110, this includes, without limitation, a line-to-line fault (i.e., a short circuit between two phases of power line 110), a line-to-ground fault (i.e., a short circuit between one phase of power line 110 and the ground), a double line-to-ground fault (i.e., a short circuit between two phases of power line 110 and the ground), or the like.

Power system 100 may also comprise one or more other control systems 140, such as a Remedial Action Scheme (RAS) system 142, a Supervisory Control and Data Acquisition (SCADA)/Energy Management System (EMS) 144, a Wide-Area Monitoring, Protection, and Control (WAMPAC) system 146, and/or the like. Each of these systems may receive data, for example, from one or more sensors (e.g., current measurement device(s) 116, voltage measurement device(s) 118, etc.) within power system 100, analyze the measurements, and perform corrective actions when appropriate. For example, an RAS system 142 generally provides automatic mitigation of violations in the performance of power system 100, other than detecting and isolating faults. Mitigation may include, without limitation, adjusting or tripping power generation, tripping a load, reconfiguring power system 100, and/or the like. A SCADA/EMS 144 monitors power system 100, such as a utility grid or regional grid, by acquiring data, and performs high-level supervision and control of power system 100 based on the acquired data and/or in response to user operations. This control may include scheduling power generation, scheduling power consumption, and/or controlling other components of power system 100. A WAMPAC system 146 is an integrated real-time system that utilizes both wide-area information and local information (e.g., voltage and current phasors, frequency, rate-of-change-of-frequency, etc.) to perform adaptive corrective control and protection actions. It should be understood that any reference herein to a control system 140 may refer to one or a combination of any of RAS system 142, SCADA/EMS 144, WAMPAC system 146, or any other system that may be used to control an SCB.

Power system 100 also comprises an SCB station 150. An SCB station 150 is any system that includes an SCB, a bypass breaker in parallel with the SCB, and a controller configured to switch the bypass breaker between an open state and a closed state. For example, as illustrated, SCB station 150 comprises an SCB 151 (e.g., the QBank™ offered by Hitachi Energy), which may comprise a group of one or a plurality of capacitors that are electrically connected in series to provide series compensation to power line 110, as well as a bypass breaker (BB) 152 (e.g., a fast bypass breaker) and a controller 154 (e.g., any of the CQ™ series of capacitor bank controllers offered by Hitachi Energy). Controller 154 comprises a protection layer 155. SCB station 150 may also comprise a metal oxide varistor (MOV) 156, discharge equipment 157, and a forced trigger spark gap 158. Collectively, MOV 156, discharge equipment 157, and forced trigger spark gap 158 may provide overvoltage protection for SCB 151. SCB station 150 may implement fixed series compensation, thyristor-controlled series compensation, or any flexible alternating current transmission system (FACTS) series compensation.

An SCB station 150, with a corresponding SCB 151, may be provided at one point or a plurality of points along power line 110 and at any suitable location(s) along power line 110. For example, a first SCB station 150 could be provided at or near first substation bus 112 and a second SCB station 150 could be provided at or near second substation bus 114. Alternatively or additionally, an SCB station 150 may be positioned at or near the middle of power line 110.

Controller 154 controls bypass breaker 152 to switch between an open state, in which SCB 151 is electrically inserted into power line 110 to provide series compensation to power line 110, and a closed state, in which SCB 151 is bypassed. Typically, SCB 151 is electrically inserted into power line 110 by opening bypass breaker 152 when power line 110 is under high power transfer conditions, and bypassed by closing bypass breaker 152 under low power transfer conditions. This control may be done manually (e.g., via a SCADA/EMS 144) or automatically (e.g., by line protection system 130, RAS system 142, WAMPAC system 146, etc.). For example, an operator may provide an input to a graphical user interface of SCADA/EMS 144 to insert or bypass SCB 151, according to planned operating conditions.

As another example, line protection system 130 may detect a line fault and send a remote control signal to controller 154 to bypass SCB 151, as well as controlling circuit breaker 120 to open in order to isolate the fault. Fast bypassing of an SCB 151 is one strategy for reducing transient recovery voltage (TRV) in extra high-voltage transmission lines (e.g., 345 kV-765 kV). Transmission lines with high degrees of series compensation have increased TRV levels, which may exceed the capability of circuit breaker 120. This can lead to damage to circuit breaker 120, as well as potential damage to other components of power system 100. For series-compensated transmission lines with potential TRV issues, line protection system 130 will simultaneously send both a line trip signal to circuit breaker 120 and a remote control signal, representing a command to bypass SCB 151, to SCB controller 154, whenever line protection system 130 detects a line fault. Given that the speed of bypass breaker 152 (e.g., approximately 5 milliseconds) is faster than the speed of circuit breaker 120 (e.g., approximately 2030 milliseconds), SCB 151 can be bypassed well in advance of circuit breaker 120 opening.

As another example, RAS system 142 may send remote control signals to controller 154 under emergency conditions. Fast bypassing or fast insertion of SCB 151 on critical transmission lines has been implemented as part of RAS actions in some regional power grids to mitigate potential risks of system instability, resulting from major generation or transmission outages. For instance, RAS system 142 may detect a critical transmission outage and send a remote control signal to controller 154 to insert SCB 151.

In either case, the controlling system 130 or 140 may send a remote control signal (e.g., via direction communications or via a communication network of power system 100) to controller 154. The remote control signal represents a command to either electrically insert SCB 151 into power line 110 or bypass SCB 151. It should be understood that the remote control signal may comprise an indication to either insert SCB 151 or bypass SCB 151 or may comprise an indication to switch the state of bypass breaker 152 between the open state and the closed state.

In an embodiment, every remote control signal that is received by controller 154 is processed by protection layer 155 prior to execution of the command. Protection layer 155 may intercept each command and implement the disclosed processes to either allow execution of the command or block execution of the command. When execution of the command is allowed by protection layer 155, controller 154 may send a signal to bypass breaker 152 representing an instruction to either open or close, according to the command. When execution of the command is blocked by protection layer 155, controller 154 may issue an alert and either discard or delay the command (e.g., until an operator or other system confirms the command)

Controller 154 may receive data reflecting information about power system 100, including current measurements from at least one current measurement device 116B and/or voltage measurements from at least one voltage measurement device 118B. This data may be used by functions, implemented in controller 154, to control one or more features of SCB station 150. Of particular relevance to the present disclosure, this data may be used by protection layer 155 to inform the disclosed process for allowing or blocking execution of the command in a remote control signal.

1.2. Example Processing Device

Figure 2:
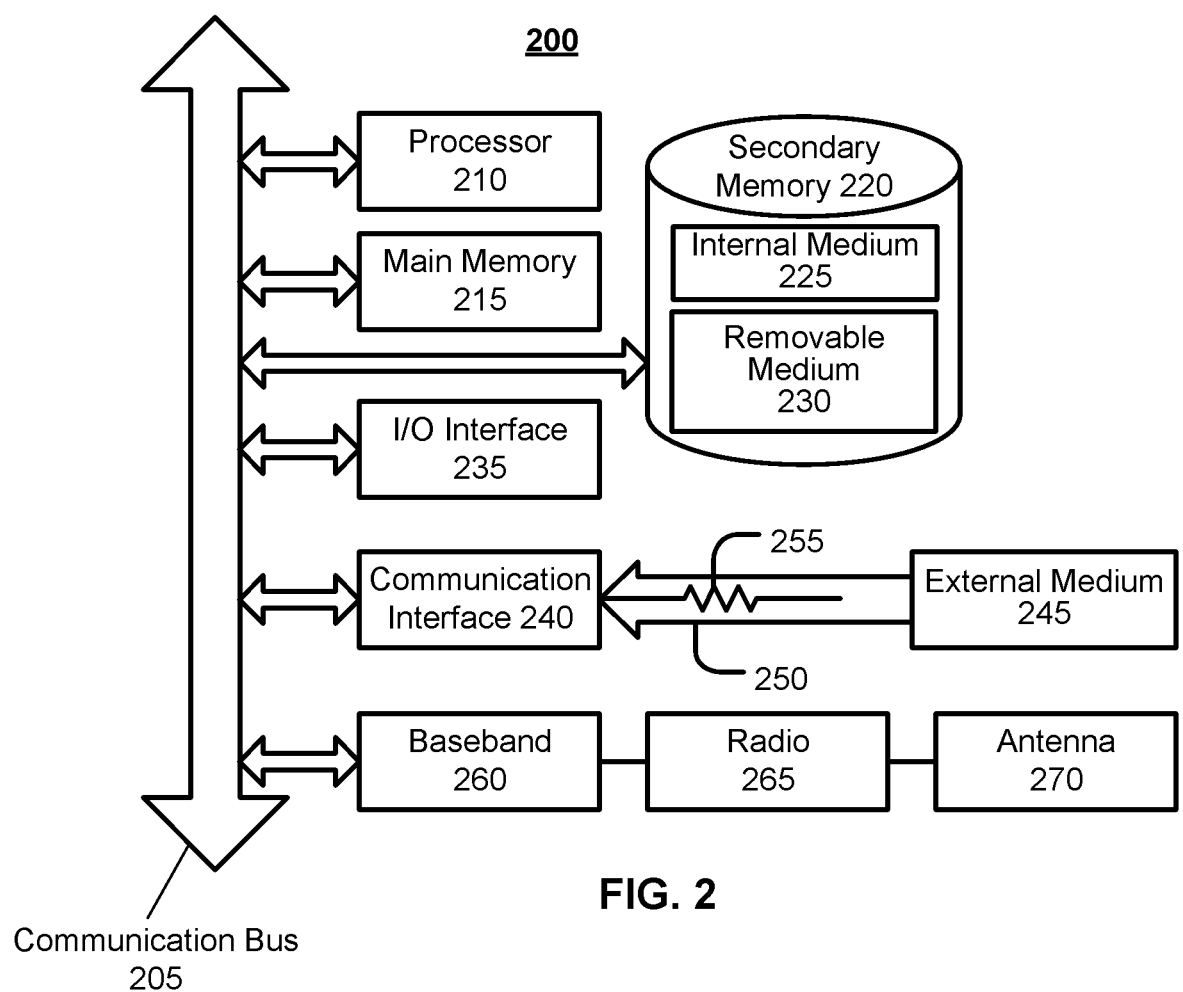
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of controller 154, line protection system 130, control system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein, such as protection layer 155) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices, networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed protection layer 155) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed protection layer 155) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

2. Process Overview

Embodiments of processes for secure control of an SCB in a power line will now be described in detail. It should be understood that the described processes may be embodied in one or more software modules that are executed by one or more hardware processors (e.g., processor 210) of controller 154, for example, as protection layer 155, stored in a memory (e.g., main memory 215) of controller 154. The described processes may be implemented as instructions represented in source code, object code, and/or machine code. These instructions may be executed directly by hardware processor(s) 210 of controller 154, or alternatively, may be executed by a virtual machine operating between the object code and hardware processor(s) 210 of controller 154.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Protection Layer

Figure 3:
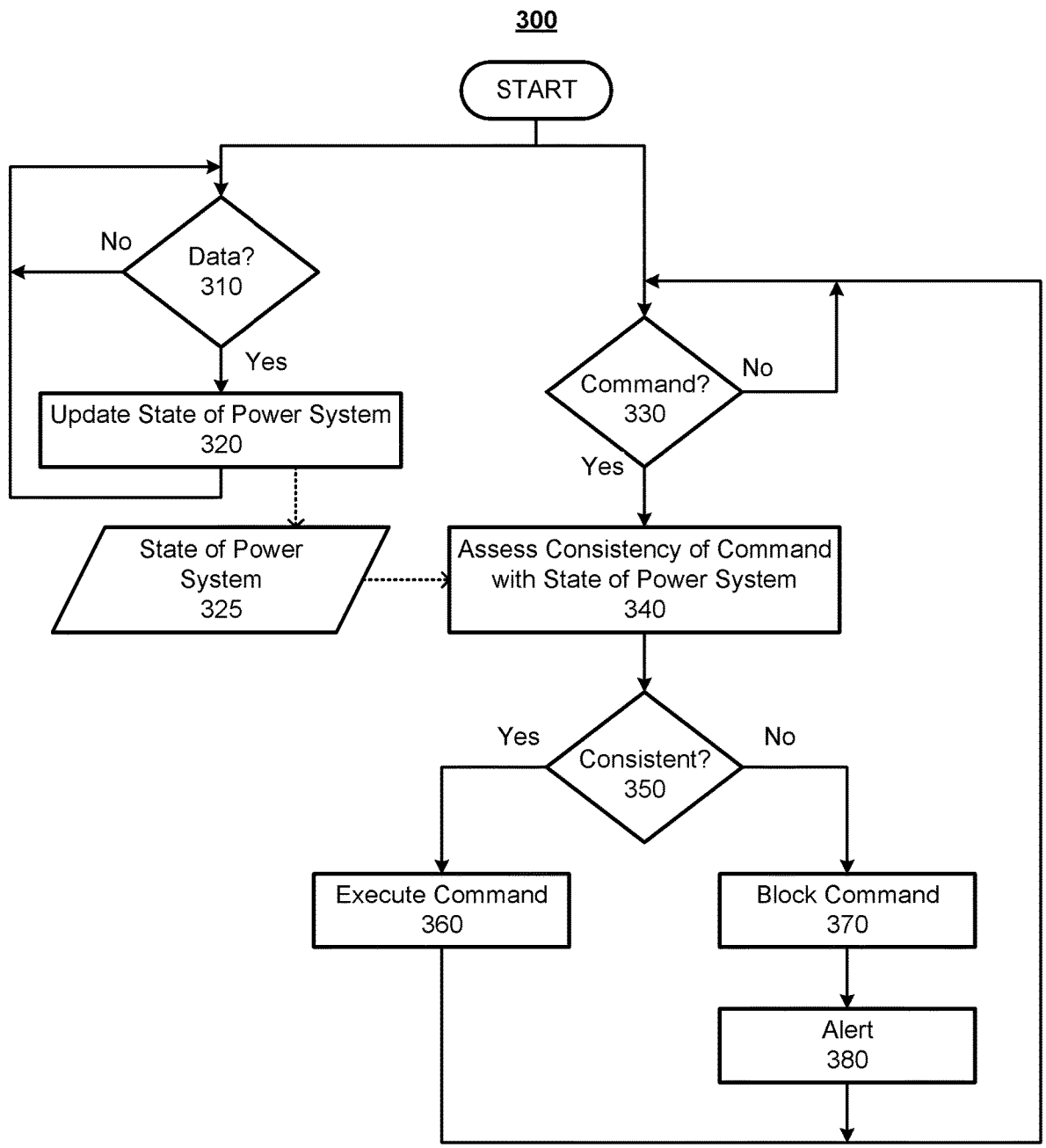
FIG. 3 illustrates a process, which may be implemented by a protection layer of a controller of an SCB station, according to an embodiment.

FIG. 3 illustrates a process 300, which may be implemented by protection layer 155 of controller 154 of each SCB station 150, according to an embodiment. Process 300 may be initiated when controller 154 is booted and execute for as long as controller 154 remains active. Process 300 may execute in the background of controller 154 to evaluate every command that is received by controller 154 in a remote control signal from a line protection system 130 and/or other control system 140, before that command can be executed by controller 154. Process 300 is designed to prevent cyberattacks directed at remote control signals sent by remote systems, such as line protection system 130 and other control systems 140, that are external to SCB station 150. Such cyberattacks may comprise altering legitimate remote control signals prior to their reception by controller 154 and/or sending false remote control signals to controller 154.

Process 300 may comprise two threads, which may execute independently of each other. A first thread comprises subprocesses 310 and 320 to collect data about the dynamic conditions of power system 100. A second thread comprises subprocesses 330-380 to evaluate each command that is received by controller 154.

In subprocess 310, process 300 monitors data related to power system 100. For example, this data may comprise current measurements acquired from current measurement device(s) 116, voltage measurements acquired from voltage measurement device(s) 118, and/or other local metrics acquired from other sensors and/or derived from the sensors. This data may be monitored at a high sampling rate in real time. As used herein, the term "real time" or "real-time" encompasses both a simultaneous occurrence and an occurrence that is delayed in time due to ordinary latencies in processing, storage, communications, and/or the like. For as long as no new data are received (i.e., "No" in subprocess 310), process 300 continues to monitor for new data. When new data are received (i.e., "Yes" in subprocess 310), process 300 proceeds to subprocess 320.

In subprocess 320, new data may be processed according to a sliding window in the range of tens of milliseconds to a few seconds. As the data are processed, process 300 may update the physical state 325 of power system 100. For example, a representation of physical state 325 of power system 100 may be stored in memory (e.g., main memory 215 and/or secondary memory 220 of controller 154). Physical state 325 may comprise real-time measurements and/or information derived from the real-time measurements, including, for example, dynamic condition indicators, such as derivatives of line current, incremental line flow changes, grid frequency deviations, voltage phase angle changes, and/or the like, within the sliding window. Controller 154 may continually update the stored representation of physical state 325, in real time, as new data are received.

In subprocess 330, process 300 monitors remote control signals received from remote systems, such as line protection system 130 and/or control systems 140 (e.g., RAS system 142, SCADA/EMS 144, WAMPAC system 146, etc.), to identify the commands within those remote control signals. For as long as no new command is received (i.e., "No" in subprocess 330), process 300 continues to monitor for new commands. Whenever a new command is received (i.e., "Yes" in subprocess 330), an iteration through the loop formed by subprocesses 340-380 is performed.

In subprocess 340, process 300 assesses whether or not the command is consistent with physical state 325 of power system 100. In particular, protection layer 155 may access the representation of physical state 325, and execute one or a plurality of security functions that are configured to detect an anomaly in physical state 325 and/or otherwise assess physical state 325. Protection layer 155 may also execute logic that determines whether or not the command is consistent with physical state 325 based on the output of the security function(s). For example, the logic may apply one or more rules to the command and the output of the security function(s) to assess whether or not the command is consistent with physical state 325. This consistency assessment is described in greater detail elsewhere herein.

If the result of the assessment in subprocess 340 is that the command is consistent with physical state 325 (i.e., "Yes" in subprocess 350), the command may be executed in subprocess 360. Otherwise, if the result of the assessment in subprocess 340 is that the command is inconsistent with physical state 325 (i.e., "No" in subprocess 350), the command may be blocked in subprocess 370 and/or an alert may be issued in subprocess 380.

It should be understood that blocking the command means that the command is not executed. In this case, the command may be discarded, ignored, or delayed until a condition is satisfied. For example, in an implementation that delays execution of the command until a condition is satisfied, an alert may be provided to an operator in subprocess 380 (e.g., via a graphical user interface of SCADA/EMS 144 or other system, an email or text message, etc.), and the operator may be required to approve the command (e.g., via the graphical user interface of SCADA/EMS 144 or other system, a reply to the email or text message, etc.) before the command is executed. As another example, protection layer 155 may trigger a confirmation function in response to a determination that the command is inconsistent with physical state 325 (i.e., "No" in subprocess 350), to confirm physical state 325 and/or the determined inconsistency. In this case, protection layer 155 may delay execution of the command until and unless confirmation is received from the confirmation function. This confirmation function may comprise requesting or awaiting confirmation from an external system, executing a higher fidelity detection algorithm to confirm a condition in power system 100 upon which the consistency assessment in subprocess 340 was based, and/or the like.

2.2. Consistency Assessment

As discussed above, subprocess 340 of process 300 assesses whether or not a received command is consistent with physical state 325 of power system 100. In particular, protection layer 155 may execute one or a plurality of security functions, and execute logic on the output of these security function(s) whenever the consistency of a command is assessed.

Figure 4:
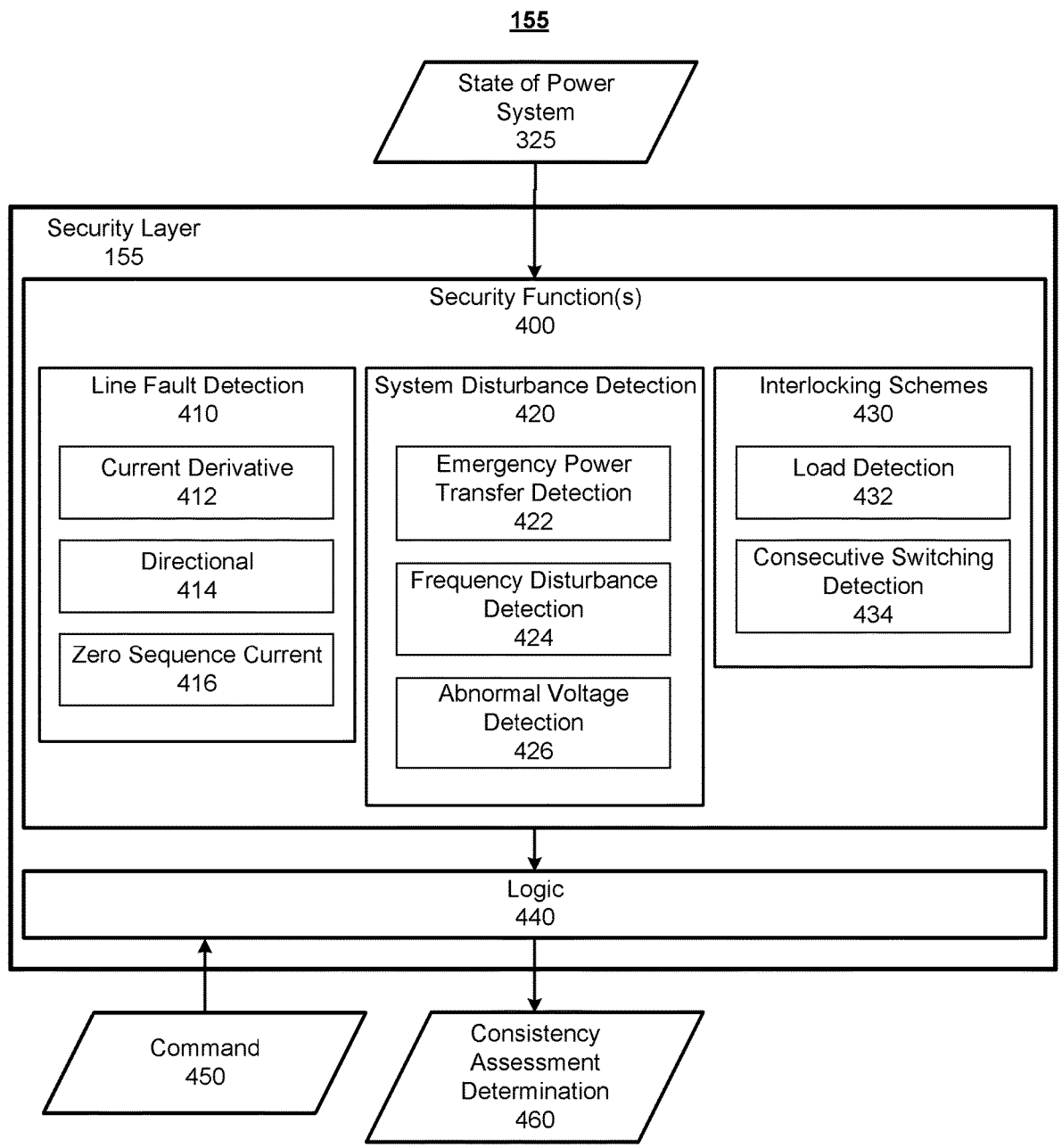
FIG. 4 illustrates examples of the security functions that may be employed by the protection layer, according to an embodiment.

FIG. 4 illustrates examples of the security functions 400 that may be employed by protection layer 155, according to an embodiment. It should be understood that not all of the illustrated security functions 400 must be utilized in a particular embodiment. Rather, more, fewer, or a different combination of the illustrated security functions 400 and/or more, fewer, or a different combination of their constituent modules may be implemented by protection layer 155. In an embodiment, security functions 400 comprise a line fault detection (LFD) function 410, a system disturbance detection (SDD) function 420, and/or an interlocking schemes (IS) function 430. LFD function 410 determines whether or not a line fault exists within a detection zone, SDD function 420 determines whether or not a system disturbance exists within power system 100 (e.g., resulting from critical generation or transmission outages), and IS function 430 may determine loading on power line 110 and/or detect consecutive switching.

LFD function 410 may comprise a current derivative module 412, a directional module 414, a zero sequence current module 416, and/or the like. Current derivative module 412 may calculate the derivative of electrical current in power line 110, for example, from consecutive measurements of the current by current measurement device(s) 116.

In general, a sudden rise in the current derivative (e.g., above a threshold) is indicative of a line fault. Directional module 414 may determine the direction of a fault on power line 110, and zero sequence current module 416 may calculate the zero sequence current in power line 110. Under normal system conditions, the zero sequence current in power line 110 is low and can be ignored. Thus, a sudden rise in the zero sequence current (e.g., above a threshold) is indicative of a line-to-ground fault. Overall, LFD function 410 may determine whether or not a line fault exists in power line 110 within a detection zone (e.g., primary detection zone, for example, defined by a reach setting that specifies the portion of power line 110 that is covered by LFD function 410), based on the outputs of current derivative module 412, directional module 414, zero sequence current module 416, and/or the like. LFD function 410 may operate in real time as data is received and stored in the representation of physical state 325 of power system 100, such that a present indication of whether or not a line fault exists in power line 110 is always readily available.

The detection zone of LFD function 410 may be approximately 50%-80% of the length of power line 110. LFD function 410 is generally not configured to cover the entire length of power line 110, because: (i) the fault detection algorithms of LFD function 410 are typically based on local measurements, and therefore, are not able to distinguish remote faults at the end of power line 110 from external faults in the forward direction; and (ii) TRV issues are less severe for clearing a remote line fault.

SDD function 420 may comprise an emergency power transfer detection module 422, a frequency disturbance detection module 424, an abnormal voltage detection module 426, and/or the like. Emergency power transfer detection module 422 may determine whether or not there has been a transmission outage or emergency power transfer to or from power line 110 (e.g., by comparing the power flow in power line 110, stored in physical state 325, before and after reception of a command). It should be understood that an emergency power transfer is any transfer of power between power lines, resulting from an emergency (e.g., outage in another power line such as a direct-current link, outage in power line 110, etc.). Frequency disturbance detection module 424 may determine whether or not a generation outage or frequency disturbance exists in power line 110 (e.g., by comparing the frequencies in power line 110, stored in physical state 325, before and after reception of a command). It should be understood that a frequency disturbance is any frequency in power line 110 that is abnormal or unexpected (e.g., a frequency above or below a threshold value, a rate of change of frequency above a threshold value, etc.). Abnormal voltage detection module 426 may determine whether or not an abnormal voltage exists in power line 110 (e.g., by comparing the voltage in power line 110, stored in physical state 325, before and after reception of a command). It should be understood that an abnormal voltage is any voltage in power line 110 that is abnormal or unexpected (e.g., a voltage above or below a threshold value). Overall, SDD function 420 may determine whether or not a system disturbance exists in power system 100 and/or what type of system disturbance exists in power system 100. A system disturbance may be any one or combination of an emergency power transfer, frequency disturbance, abnormal voltage, and/or any other anomalous event on power line 110 whose existence and/or non-existence can be detected from the measurements received by controller 154. SDD function 420 may operate in real time as data is received and stored in the representation of physical state 325 of power system 100, such that a current indication of whether or not a system disturbance exists in power system 100 is always readily available. However, in an embodiment, SDD function 420 operates in response to reception of a command. In addition, the particular module(s) (e.g., 422, 424, or 426) to be executed may be selected based on the command.

IS function 430 may comprise a load detection module 432, a consecutive switching detection module 434, and/or the like. Load detection module 432 may detect the load on power line 110. For example, the load may be characterized as low when it is below a first threshold, normal when it exceeds the first threshold and is below a second threshold, and high when it exceeds the second threshold. Consecutive switching detection module 434 may detect whether or not a command is received within a time window from execution of a prior command.

It is assumed that any command 450 that is received by controller 154 may be malicious. Thus, protection layer 155 assesses each command 450 that is received. Whenever a command 450 is to be assessed (e.g., in subprocess 340 of process 300), logic 440 may be executed with the output of security function(s) 400 and command 450 as inputs, to output a consistency assessment determination 460 (e.g., to be used for the determination in subprocess 350 of whether to allow or block the command). Logic 440 may apply one or more rules to the output of security function(s) 400 and command 450 to render consistency assessment determination 460.

As an example, protection layer 155 may receive a command 450 to bypass SCB 151, in a remote control signal purportedly sent from line protection system 130. Logic 440 may access the indication of whether or not a line fault exists in the detection zone on power line 110, most recently output by LFD function 410, to determine whether or not a line fault exists. When command 450 is to bypass SCB 151 while no line fault is determined to exist within the detection zone by LFD function 410, logic 440 may determine that command 450 is inconsistent with physical state 325 of power system 100 (e.g., "No" in subprocess 350 of process 300). On the other hand, when command 450 is to bypass SCB 151 while a line fault is determined to exist within the detection zone by LFD function 410, logic 440 may determine that command 450 is consistent with physical state 325 of power system 100 (e.g., "Yes" in subprocess 350 of process 300).

Notably, in an embodiment in which LFD function 410 operates in the background to determine whether or not a line fault exists in real time, logic 440 may determine the consistency of command 450 very quickly (e.g., within a few milliseconds from receipt of command 450). This is because logic 440 is applying a rule to existing output from LFD function 410, without having to calculate a new output from LFD function 410. Thus, the disclosed embodiments ensure that fast bypassing of SCB 151 can be achieved when a line fault occurs, while simultaneously providing security against inconsistent and potentially malicious commands.

As another example, protection layer 155 may receive a command 450 to insert SCB 151 in a remote control signal purportedly sent from a control system 140 (e.g., RAS system 142, WAMPAC system 146, etc.) in response to a major transmission outage. Logic 440 may acquire the output of emergency power transfer detection module 422 of SDD function 420, which may be executed in response to reception of command 450 or by logic 440. Emergency power transfer detection module 422 may examine power flow changes in power line 110 to determine whether or not an emergency power transfer to power line 110 exists within a time window around receipt of the remote control signal comprising command 450. When command 450 is to insert SCB 151 and no emergency power transfer is determined to exist by SDD function 420 within the time window, logic 440 may determine that command 450 is inconsistent with physical state 325 of power system 100 (e.g., "No" in subprocess 350 of process 300). On the other hand, when command 450 is to insert SCB 151 and an emergency power transfer is determined to exist by SDD function 420, logic 440 may determine that command 450 is consistent with physical state 325 of power system 100 (e.g., "Yes" in subprocess 350 of process 300).

As another example, protection layer 155 may receive a command 450 to insert or bypass SCB 151 in a remote control signal purportedly sent from a control system 140 (e.g., RAS system 142, WAMPAC system 146, etc.) in response to a frequency disturbance. Logic 440 may acquire the output of frequency disturbance detection module 424 of SDD function 420, which may be executed in response to reception of command 450 or by logic 440. Frequency disturbance detection module 424 may analyze physical state 325 to determine whether or not a frequency disturbance exists within a time window around receipt of the remote control signal comprising command 450. When command 450 is to one of insert SCB 151 or bypass SCB 151 and no frequency disturbance is determined to exist by SDD function 420 within the time window, logic 440 may determine that command 450 is inconsistent with physical state 325 of power system 100 (e.g., "No" in subprocess 350 of process 300). On the other hand, when command 450 is to the other one of insert SCB 151 or bypass SCB 151 and the frequency disturbance is determined to exist by SDD function 420, logic 440 may determine that command 450 is consistent with physical state 325 of power system 100 (e.g., "Yes" in subprocess 350 of process 300). It should be understood that, whether a command 450 to insert SCB 151 or bypass SCB 151 is consistent with the frequency disturbance will depend on the particular frequency disturbance that is detected.

As another example, protection layer 155 may receive a command 450 to insert or bypass SCB 151 in a remote control signal purportedly sent from a control system 140 (e.g., RAS system 142, WAMPAC system 146, etc.) in response to an abnormal voltage. Logic 440 may acquire the output of abnormal voltage detection module 426 of SDD function 420, which may be executed in response to reception of command 450 or by logic 440. Abnormal voltage detection module 426 may analyze physical state 325 to determine whether or not an abnormal voltage exists within a time window around receipt of the remote control signal comprising command 450. When command 450 is to one of insert SCB 151 or bypass SCB 151 and no abnormal voltage is determined to exist by SDD function 420 within the time window, logic 440 may determine that command 450 is inconsistent with physical state 325 of power system 100 (e.g., "No" in subprocess 350 of process 300). On the other hand, when command 450 is to the other one of insert SCB 151 or bypass SCB 151 and the abnormal voltage is determined to exist by SDD function 420, logic 440 may determine that command 450 is consistent with physical state 325 of power system 100 (e.g., "Yes" in subprocess 350 of process 300). It should be understood that, whether a command 450 to insert SCB 151 or bypass SCB 151 is consistent with the abnormal voltage will depend on the particular abnormality in voltage that is detected.

Notably, in an embodiment in which SDD function 420 is executed in response to receiving a command 450, the relevant modules (e.g., 422, 424, 426, etc.) that are executed may be constrained to execute and produce an output within a time window from receiving the remote control signal comprising command 450. Logic 440 may utilize whatever output is produced within the time window to determine the consistency of command 450 with physical state 325. The time window may be a few hundred milliseconds (e.g., within 500 milliseconds) from reception of the remote control signal. This ensures that fast insertion or bypassing of SCB 151 can be achieved, to prevent damage to power system 100.

In an embodiment, SDD function 420 may be used as a defense against denial-of-service (DoS) attacks. In a DoS attack, the remote control command from a control system 140 (e.g., RAS system 142) may be blocked or compromised by an attacker. For example, if an attacker successfully blocked an insertion command from RAS system 142, during an abnormal line flow increase, this may lead to severe power swings in power line 110. Power system 100 may become unstable if SCBs 151 are not quickly inserted. Thus, SDD function 420 may continuously monitor physical state 325 of power system 100, and determine whether or not the dynamic conditions represented in physical state 325 satisfy a predefined condition, comprising one or more criteria indicative of a system disturbance. It should be understood that emergency power transfer detection module 422, frequency disturbance detection module 424, abnormal voltage detection module 426, and/or other modules of SDD function 420 may each detect a predefined condition representing a different system disturbance. Whenever SDD function 420 detects a system disturbance or certain severe system disturbances, SDD function 420 may automatically issue an alarm (e.g., in the same or similar manner as in subprocess 380 of process 300). Additionally or alternatively, whenever SDD function 420 detects a system disturbance or certain severe system disturbances, SDD function 420 may automatically initiate a fast insertion of SCB 151. In particular, SDD function 420 may instruct controller 154 to open bypass breaker 152.

As another example, protection layer 155 may receive a command 450 to insert or bypass SCB 151 in a remote control signal purportedly sent from a control system 140 (e.g., SCADA/EMS 144). Logic 440 may acquire the output of load detection module 432 of IS function 430, which may be executed in response to reception of command 450 or by logic 440. Load detection module 432 may analyze physical state 325 to determine the present load on power line 110. When command 450 is to insert SCB 151 and the present load is below a first threshold, representing low load, logic 440 may determine that command 450 is inconsistent with physical state 325 of power system 100. Likewise, when command 450 is to bypass SCB 151 and the present load exceeds a second threshold, representing high load, logic 440 may determine that command 450 is inconsistent with physical state 325 of power system 100. Bypassing SCB 151 under high load conditions may overload other parallel power lines. On the other hand, when command 450 is to insert SCB 151 and the present load exceeds the second threshold, representing high load, logic 440 may determine that command 450 is consistent with physical state 325 of power system 100. Likewise, when command 450 is to bypass SCB 151 and the present load is below the first threshold, representing low load, logic 440 may determine that command 450 is consistent with physical state 325 of power system 100. In principle, SCB 151 should be inserted under high load conditions and bypassed under low load conditions.

As another example, protection layer 155 may receive a command 450 to insert or bypass SCB 151 in a remote control signal purportedly sent from a control system 140 (e.g., SCADA/EMS 144). Logic 440 may acquire the output of consecutive switching detection module 434, which may be executed in response to reception of command 450 or by logic 440. Consecutive switching detection module 434 may determine whether present command 450 is received within a time window from execution of a prior command and represents a switch in the state of SCB 151 over the prior command. For example, when present command 450 is to insert SCB 151 and is received within the time window from execution of a prior command to bypass SCB 151, logic 440 may determine that present command 450 is inconsistent with physical state 325 of power system 100. Likewise, when present command 450 is to bypass SCB 151 and is received within the time window from execution of a prior command to insert SCB 151, logic 440 may determine that present command 450 is inconsistent with physical state 325 of power system 100. Consecutive switching between insertion and bypassing of SCB 151 within a short period of time may cause forced power swings, inter-area power oscillations, and instability in a poorly damped power system 100. The time window may be set to an appropriate length of time to prevent these swings and instability in power system 100, thereby blocking malicious switching commands.

It should be understood that logic 440 may combine the outputs of two or more security functions 400 to produce consistency assessment determination 460. In particular, logic 440 may apply rules that resolve conflicts between two or more security functions 400. For example, if assessments of command 450 across all security functions 400 all result in a determination that command 450 is consistent with physical state 325, consistency assessment determination 460 may be that command 450 is consistent with physical state 325. Likewise, if assessments of command 450 across all security functions 400 all result in a determination that command 450 is inconsistent with physical state 325, consistency assessment determination 460 may be that command 450 is inconsistent with physical state 325. In an embodiment, if there are a mixture of determinations (i.e., one or more determinations of consistency and one or more determinations of inconsistency), logic 440 may apply rules to render a final consistency assessment determination 460, such as always determining that command 450 is inconsistent with physical state 325, choosing the consensus determination if there are three or more security functions 400, prioritizing security functions 400 and selecting the determination of the security function 400 with the highest priority, weighting the security functions 400 and selecting the determination with the highest weight, or the like.

3. Example Scenarios

The performance of disclosed embodiments with respect to example scenarios will now be described. It should be understood that these are non-limiting examples intended to illustrate the operation of disclosed embodiments, and are not a requirement of any embodiment.

Figure 5A:
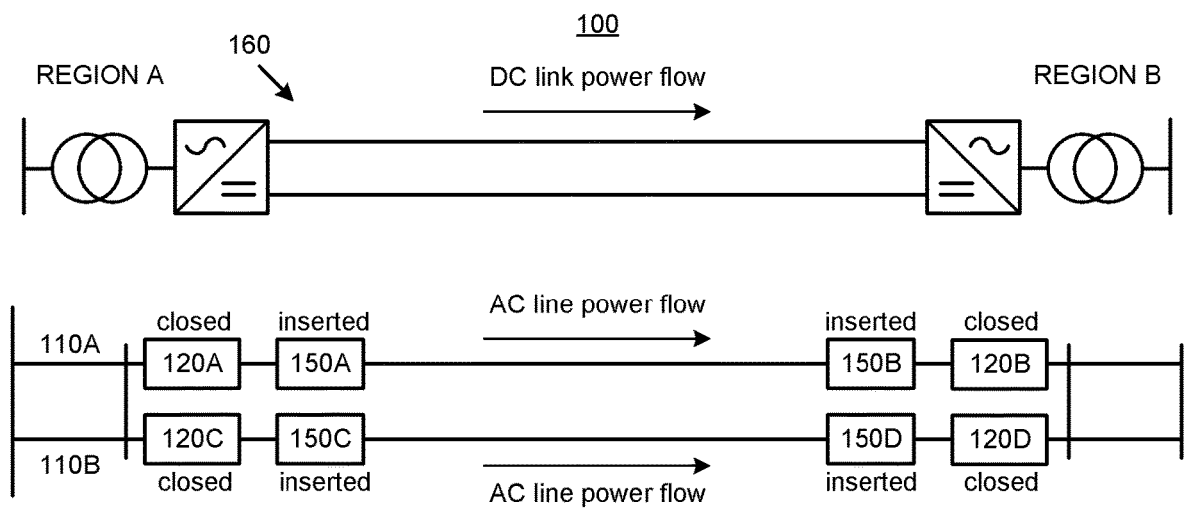
FIGS. 5A and 5B illustrate the status of a power system, before and after a line fault, respectively, according to an example scenario.
Figure 5B:
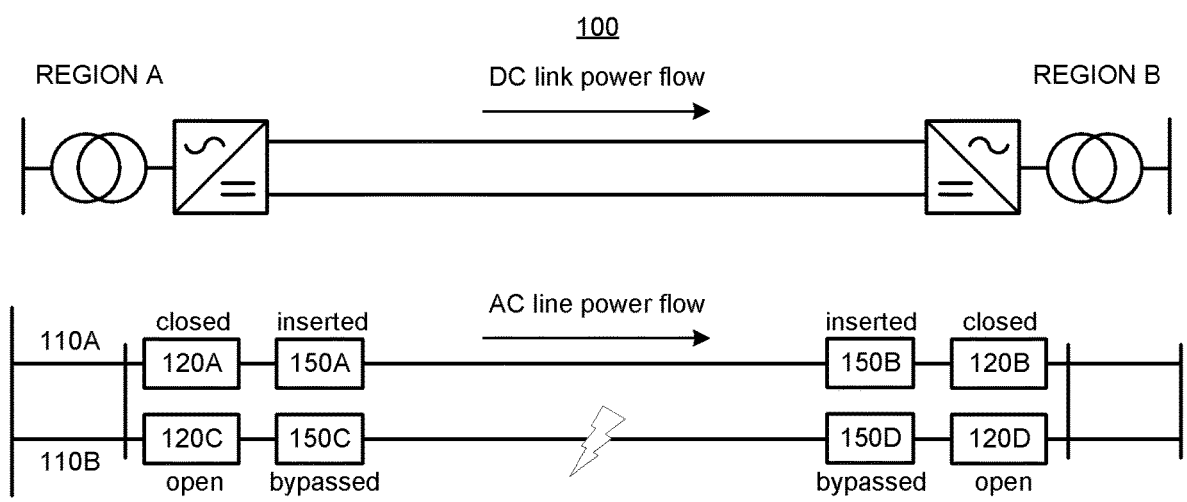

FIGS. 5A and 5B illustrate the status of a power system 100, before and after a line fault, respectively, according to an example scenario. In the illustrated scenarios, power system 100 is a transmission system that transmits electricity along a transmission corridor between Region A and Region B. The transmission corridor consists of a high-voltage direct current (DC) link 160 and an AC link with two AC transmission lines 110A and 110B. Each AC transmission line 110A and 110B is series compensated by two SCB stations 150. In particular, AC transmission line 110A comprises, in series from Region A to Region B, a circuit breaker 120A, SCB station 150A, SCB station 150B, and circuit breaker 120B. Similarly, AC transmission line 110B comprises, in series from Region A to Region B, a circuit breaker 120C, SCB station 150C, SCB station 150D, and circuit breaker 120D.

In the pre-fault condition, illustrated in FIG. 5A, the SCB 151 of each SCB station 150A-150D is inserted (i.e., each respective bypass breaker 152 is in the open state), and all circuit breakers 120A-120D are closed. Thus, both AC transmission lines 110A and 110B are being series-compensated. In the fault condition, a three-phase-to-ground fault occurs in the approximate middle of AC transmission line 110B, such that it is within the detection zone of LFD function 410 for both SCB stations 150C and 150D. Line protection system 130 will issue a bypass command to SCB stations 150C and 150D on AC transmission line 110B, and will open circuit breakers 120C and 120D on AC transmission line 110B. As a result, in the post-fault condition, illustrated in FIG. 5B, the SCB 151 of each SCB station 150C and 150D on AC transmission line 110B is bypassed (i.e., the respective bypass breakers 152 are switched to the closed state). Thereafter, circuit breakers 120C and 120D on AC transmission line 110B are opened. Bypassing SCB 151, prior to opening the corresponding circuit breaker 120, in this manner, may mitigate transient recovery voltages. Notably, no changes occur on AC transmission line 110A.

Figure 6:
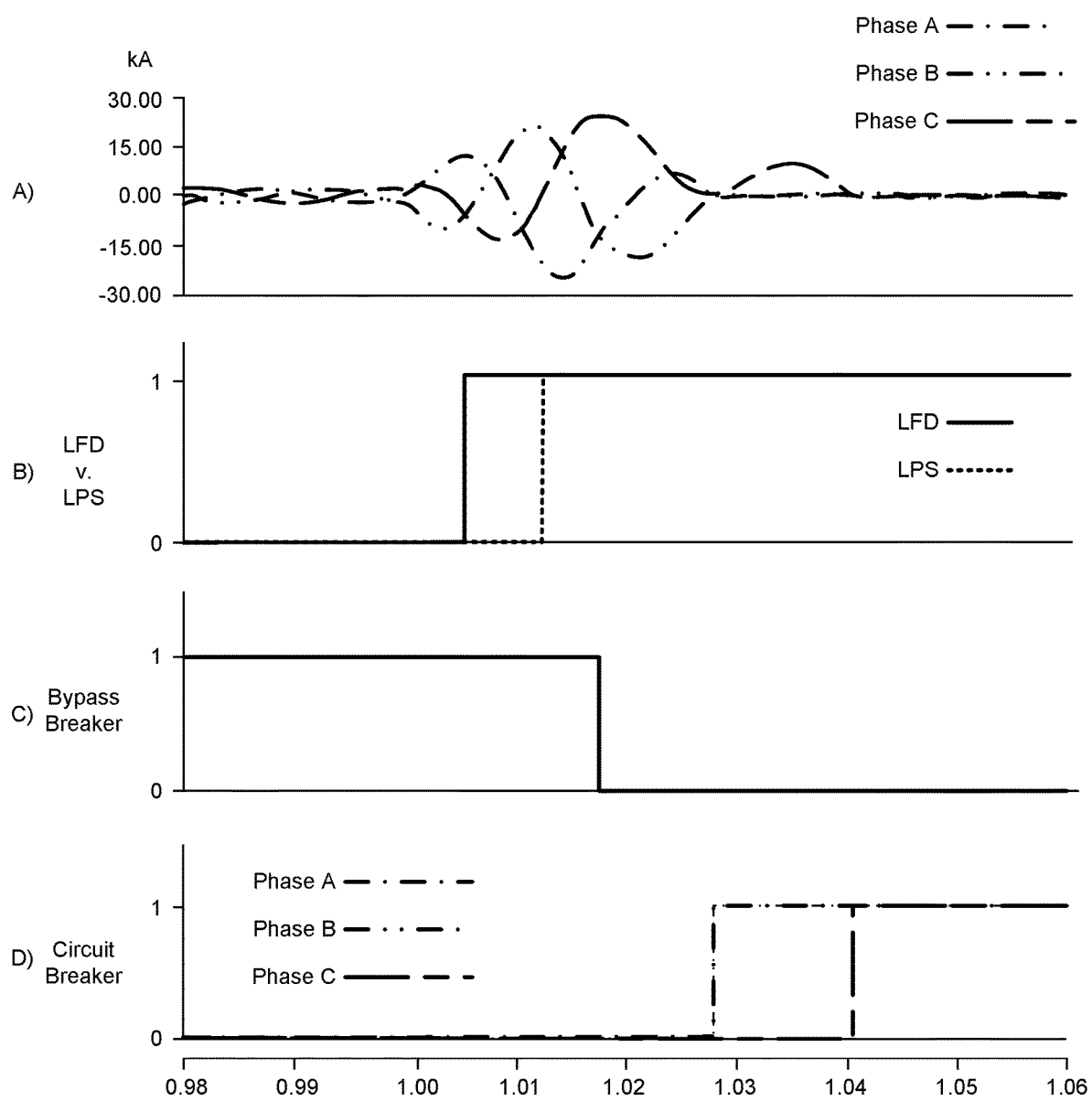
FIG. 6 illustrates plots representing the performance of a simulation of the scenario illustrated in FIGS. 5A and 5B, according to an embodiment.

FIG. 6 consists of four plots, along the same time line (in seconds), that illustrate the current for each of the three phases in AC transmission line 110B, the output of LFD function 410 versus a remote control signal received from line protection system 130, the position of bypass breaker 152, and the position of circuit breaker 120 for each of the three phases in AC transmission line 110B, respectively, representing the results of a simulation of the scenario illustrated in FIGS. 5A and 5B, according to an embodiment. Plot A in FIG. 6 illustrates the current of the three phases of AC transmission line 110B.

Plot B in FIG. 6 illustrates the time at which LFD function 410 detects the line fault, relative to the time at which a remote control signal, comprising a command to bypass SCB 151, is received from line protection system 130. A value of 0 represents the absence of a signal and the value of 1 represents the presence of a signal. As illustrated, LFD function 410 detects the line fault relatively quickly (i.e., within about 5 milliseconds from the occurrence of the line fault). Typically, line protection system 130 can detect a line fault within the detection zone within half-cycle time. The communication of the bypass command from line protection system 130 and SCB station 150 may add a communication delay (e.g., approximately 2 milliseconds). Thus, LFD function 410 detects the line fault before the remote control signal, comprising the bypass command, is received from line protection system 130. Accordingly, since the line fault is already confirmed by the time that the bypass command is received, logic 440 can immediately determine that the bypass command is consistent with physical state 325 (i.e., "Yes" in subprocess 350 of process 300), and controller 154 may quickly execute the bypass command (e.g., subprocess 360 of process 300). It should be understood that Plot B may be representative of the operation of each SCB station 150C and 150D.

Plots C and D in FIG. 6 represent the positions of a bypass breaker 152 on AC transmission line 110B and the position of a circuit breaker 120 for each of the phases of AC transmission line 110B, respectively. A value of 0 represents the closed state and a value of 1 represents the open state. As illustrated, due to the quick determination by protection layer 155, bypass breaker 152 closes soon after the bypass command is received from line protection system 130. Notably, circuit breaker 120 for phase C opens a half-cycle after circuit breakers 120 for phases A and B open, due to different current zero-cross moments. It should be understood that Plots C and D may be representative of the operation of each SCB station 150C and 150D and each circuit breaker 120C and 120D, respectively.

Notably, in the scenario described above, the remote control signal was a valid signal that was determined to be consistent. In the event that the remote control signal from line protection system 130 was malicious, the signal from line fault detection module 410 would never indicate the existence of a line fault (i.e., would remain at a value of 0). Consequently, bypass breakers 152 on AC transmission line 110B would remain open. In other words, logic 440 may determine that, when the signal from line fault detection module 410 and the signal from line protection system 130 both have a value of 1, then the command is consistent. Conversely, logic 440 may determine that, when the signal from line fault detection module 410 has a value of 0 and the signal from line protection system 130 has a value of 1, then the command is inconsistent. It should be understood that, when the signal from line protection system 130 has a value of 0, logic 440 may not execute, since this implies that no command has been received.

Figure 7A:
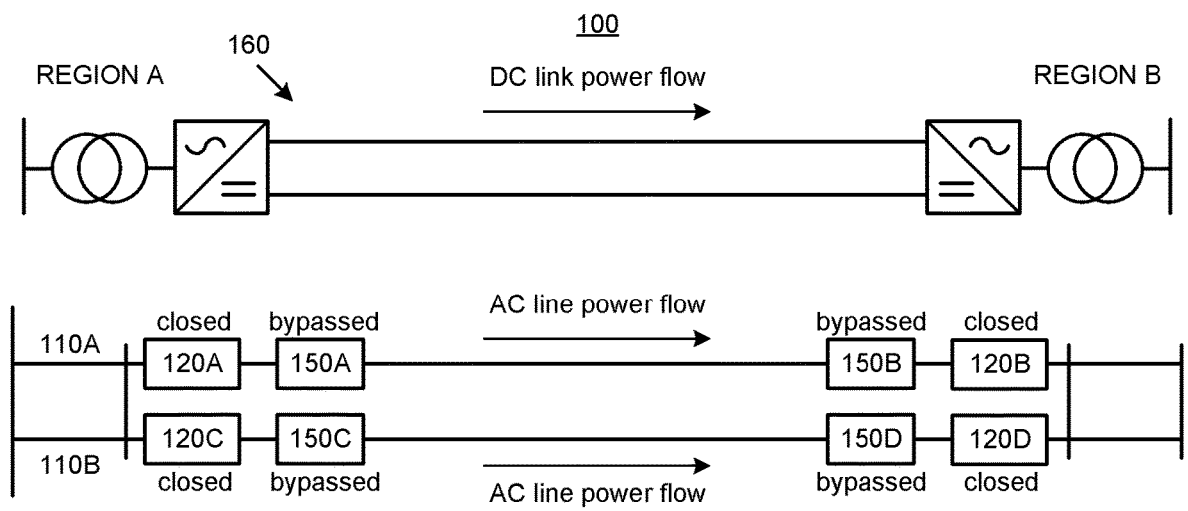
FIGS. 7A and 7B illustrate the status of a power system, before and after an emergency power transfer, respectively, according to an example scenario.
Figure 7B:
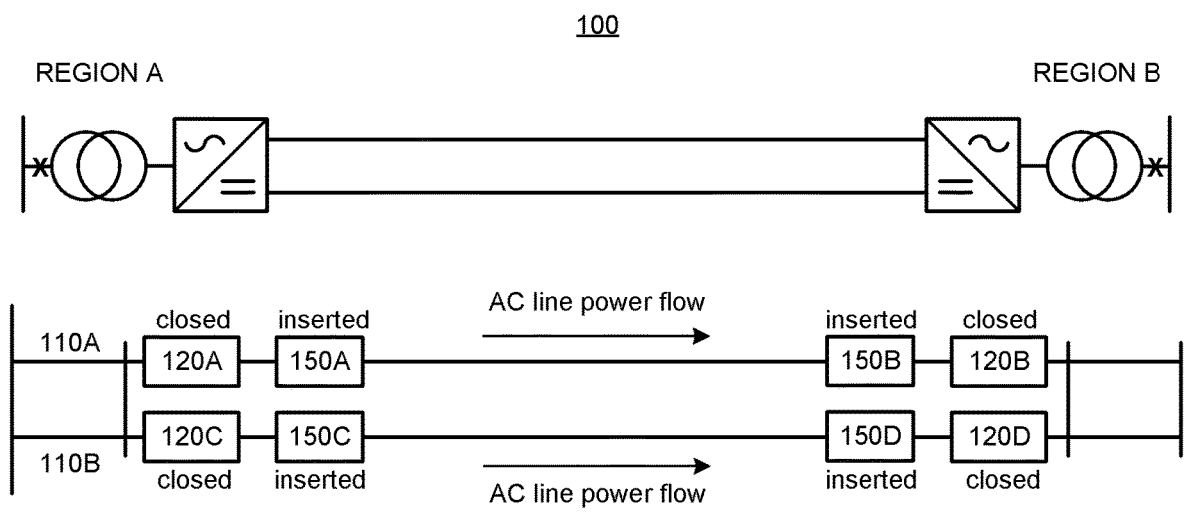

FIGS. 7A and 7B illustrate the status of a power system 100, before and after an emergency power transfer, respectively, according to an example scenario. The components of power system 100 in FIGS. 7A and 7B are the same as the components of power system 100 in FIGS. 5A and 5B, and therefore, will not be redundantly described herein.

In the pre-transfer condition, illustrated in FIG. 7A, the SCB 151 of each SCB station 150A-150D is bypassed (i.e., each respective bypass breaker 152 is in the closed state), and all circuit breakers 120A-120D are closed. Thus, neither of AC transmission lines 110A and 110B are being series compensated. As illustrated in FIG. 7B, there is a forced outage of DC link 160, which causes a severe system disturbance, resulting in an emergency power transfer to AC lines 110A and 110B. Consequently, RAS system 142 will issue an insertion command to SCB stations 150A-150D, in order to effectively compensate the line inductive reactance of AC transmission lines 110A and 110B, and enhance the stability of power system 100 against high power swings. As a result, in the post-transfer condition, illustrated in FIG. 7B, the SCB 151 of each SCB station 150A-150D is inserted (i.e., the respective bypass breakers 152 are switched to the open state). Circuit breakers 120A-120D remain closed.

Figure 8:
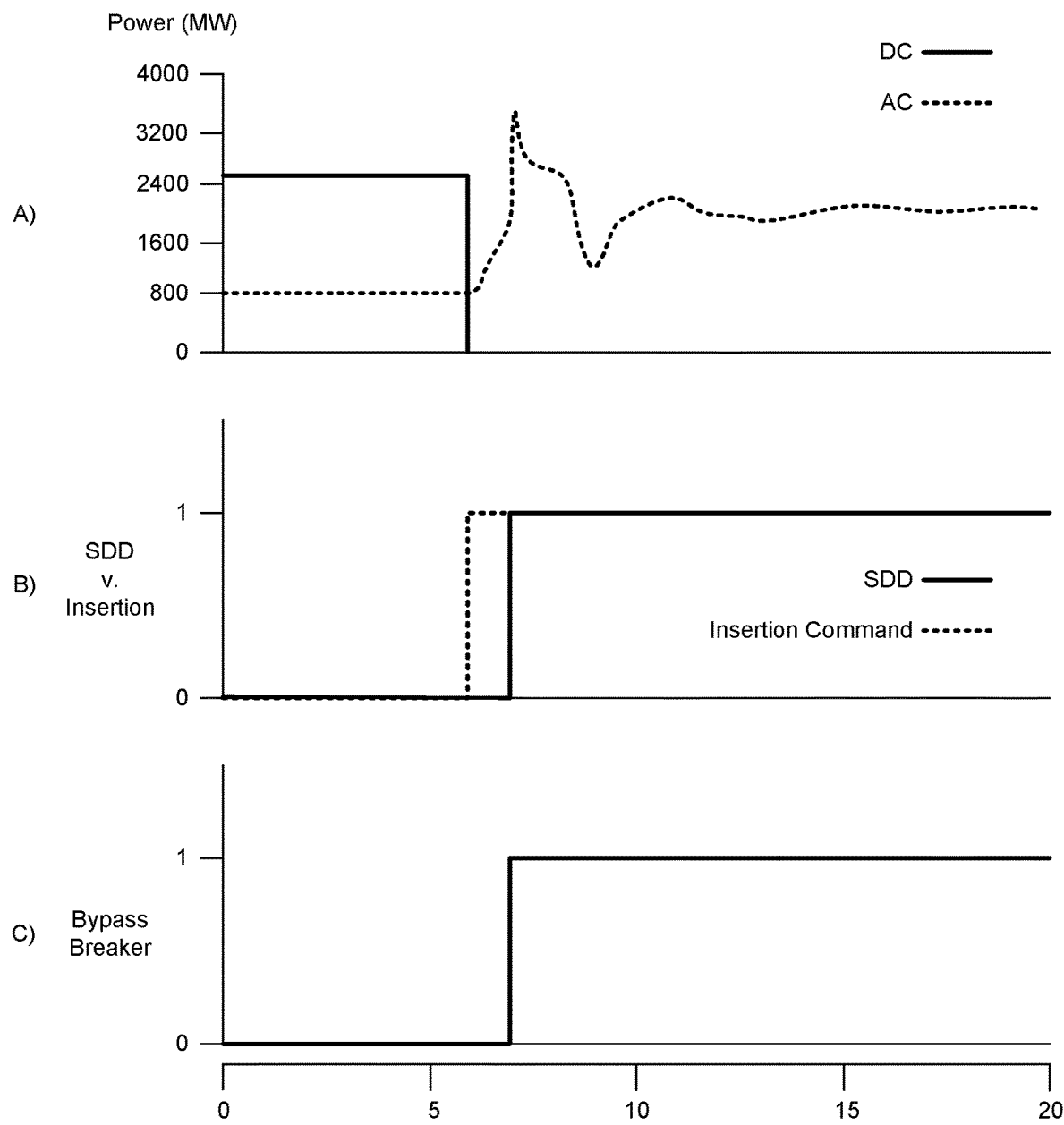
FIG. 8 illustrates plots representing the performance of a simulation of the scenario illustrated in FIGS. 7A and 7B, according to an embodiment.

FIG. 8 consists of three plots, along the same time line (in seconds), that illustrate the load on DC link 160 and the AC link consisting of power lines 110A and 110B, the output of SDD function 420 versus a remote control signal received from RAS system 142, and the position of bypass breaker 152 for each of SCB stations 150A-150D, respectively, representing the results of a simulation of the scenario illustrated in FIGS. 7A and 7B, according to an embodiment. Plot A in FIG. 8 illustrates the power flows on DC link 160 and the AC link, and depicts an outage on DC link 160 at a time of about 6 seconds along the time line.

Plot B of FIG. 8 illustrates the time at which emergency power transfer detection module 422 of SDD function 420 detects the emergency power transfer, relative to the time at which a remote control signal, comprising a command to insert SCB 151, is received from RAS system 142. A value of 0 represents the absence of a signal and the value of 1 represents the presence of a signal. It is assumed in this scenario that the remote control signal is sent by RAS system 142 immediately upon occurrence of the outage on DC link 160, without any time delay, but this may not be the case in practice. As illustrated, emergency power transfer detection module 422 detects the emergency power transfer relatively quickly (e.g., within 1 second) after the insertion command is received. Thus, logic 440 can quickly determine that the insertion command is consistent with physical state 325 (i.e., "Yes" in subprocess 350 of process 300), and controller 154 may quickly execute the insertion command (e.g., subprocess 360 of process 300). It should be understood that Plot B may be representative of the operation of each SCB station 150A-150D.

Plot C of FIG. 8 represents the positions of bypass breaker 152, with a value of 0 representing the closed state and a value of 1 representing the open state. As illustrated, bypass breaker 152 opens immediately after emergency power transfer detection module 422 of SDD function 420 detects the emergency power transfer, which is soon after the insertion command is received from RAS system 142. It should be understood that Plot C may be representative of the operation of each SCB station 150A-150D.

Notably, in the scenario described above, the remote control signal was a valid signal that was determined to be consistent. In the event that the remote control signal from RAS system 142 was malicious, the signal from SDD function 420 would never indicate the existence of a system disturbance (i.e., would remain at a value of 0). Consequently, bypass breakers 152 of SCB stations 150A-150D would remain closed. In other words, logic 440 may determine that, when the signal from emergency power transfer detection module 422 and the signal from RAS system 142 both have a value of 1, then the command is consistent. Conversely, logic 440 may determine that, when the signal from emergency power transfer detection module 422 has a value of 0 and the signal from RAS system 142 has a value of 1, then the command is inconsistent. It should be understood that, when the signal from RAS system 142 has a value of 0, logic 440 may not execute, since this implies that no command has been received.

4. Example Embodiments

Power systems 100, such as transmission systems, may comprise one or more SCBs 151 in one or more SCB stations 150 on one or more power lines 110. Each SCB station 150 may be controlled by remote control signals sent by remote systems, such as line protection system 130 or one or more control systems 140, to insert or bypass its respective SCB 151, according to scheduled or emergency switching operations. For example, an SCB station 150 may receive commands from a system operator through a SCADA/EMS 144 for scheduled operations, receive fast bypass commands from a line protection system 130 for TRV reduction, receive fast bypass or insertion commands from system protection schemes (e.g., implemented in control system(s) 140) as part of a stability enhancement strategy against critical generation or transmission outages, and/or the like.

Hackers may gain access to communication channels in power system 100 and cause unauthorized or altered insertion commands or bypass commands to be sent to SCB stations 150, in order to manipulate positions of SCB 151. These malicious commands may cause deteriorated conditions and risk instability in power system 100, potentially leading to the collapse of power system 100. Thus, protection against malicious control of SCB 151 is deemed critical.

In an embodiment, one or more, and potentially all, SCB stations 150 in a power system 100 may comprise a controller 154 that stores and executes a protection layer 155. Protection layer 155 may intercept all commands to insert or bypass SCB 151 of SCB station 150, received from a remote system (e.g., line protection system 130, control system 140, etc.), and assess whether or not the commands are consistent with a physical state 325 of power system 100. The assessment may utilize local real-time measurements of voltages and currents that are monitored by controller 154, one or more security functions 400 that detect one or more conditions in the real-time measurements, and logic 440 that applies one or more rules to the detected condition(s) and the commands. Based on this assessment, protection layer 155 may determine whether to execute a given command (e.g., in subprocess 360 of process 300) or block the given command (e.g., in subprocess 370 of process 300). In this manner, protection layer 155 may prevent cyberattacks that are intended to manipulate SCB positions in power lines 110.

Embodiments of protection layer 155 provide fast and reliable detection of line faults within a detection zone (e.g., primary detection zone) and system disturbances indicative of contingencies of concern. In addition, embodiments of protection layer 155 utilize efficient detection algorithms to detect conditions of concern based on local measurements, and logic 440 to apply one or more rules for assessing consistency of a command, which are readily implementable in controller 154 of an SCB station 150. In addition, in an embodiment, SDD function 420 can be used as a defense against DoS attacks by initiating fast SCB bypass or insertion in the event that control commands (e.g., from RAS system 142) are compromised or blocked by attackers. Protection layer 155 may also block unwanted control commands sent by remote systems that are malfunctioning.

Embodiment 1: A method comprising using at least one hardware processor, within a controller of a series capacitor bank (SCB) station, to: receive a remote control signal from a system that is external to the SCB station, wherein the remote control signal represents a command to either electrically insert the SCB into a power line within a power system or bypass the SCB; assess whether or not the command is consistent with a physical state of the power system; when the command is inconsistent with the physical state of the power system, block execution of the command by the controller; and, when the command is consistent with the physical state of the power system, allow execution of the command by the controller.

Embodiment 2: The method of Embodiment 1, further comprising using the at least one hardware processor to, when the command is inconsistent with the physical state of the power system, initiate an alert to one or more recipients.

Embodiment 3: The method of any preceding embodiment, further comprising using the at least one hardware processor to execute a line-fault detection (LFD) function that determines whether or not a line fault exists within a detection zone, wherein assessing whether or not the command is consistent with the physical state of the power system comprises: determining that the command is inconsistent with the physical state of the power system when the command is to bypass the SCB and is received while no line fault is determined to exist within the detection zone by the LFD function; and determining that the command is consistent with the physical state of the power system when the command is to bypass the SCB and is received while the line fault is determined to exist within the detection zone by the LFD function.

Embodiment 4: The method of Embodiment 3, wherein the remote control signal is received from a line protection system.

Embodiment 5: The method of any preceding embodiment, further comprising using the at least one hardware processor to execute a system disturbance detection (SDD) function that determines whether or not a system disturbance exists within the power system, wherein assessing whether or not the command is consistent with the physical state of the power system comprises determining whether or not the command is consistent based on an existence or non-existence of the system disturbance, as determined by the SDD function, within a time window around receipt of the remote control signal.

Embodiment 6: The method of Embodiment 5, wherein the system disturbance comprises an emergency power transfer, and wherein determining whether or not the command is consistent based on the existence or non-existence of the system disturbance comprises: determining that the command is inconsistent when the command is to insert the SCB and no emergency power transfer is determined to exist by the SDD function within the time window; and determining that the command is consistent when the command is to insert the SCB and the emergency power transfer is determined to exist by the SDD function within the time window.

Embodiment 7: The method of Embodiment 5 or 6, wherein the system disturbance comprises a frequency disturbance, and wherein determining whether or not the command is consistent based on the existence or non-existence of the system disturbance comprises: determining that the command is inconsistent when the command is to one of insert the SCB or bypass the SCB and no frequency disturbance is determined to exist by the SDD function within the time window; and determining that the command is consistent when the command is to the other one of insert the SCB or bypass the SCB and the frequency disturbance is determined to exist by the SDD function within the time window.

Embodiment 8: The method of any one of Embodiments 5 through 7, wherein the system disturbance comprises an abnormal voltage, and wherein determining whether or not the command is consistent based on the existence or non-existence of the system disturbance comprises: determining that the command is inconsistent when the command is to one of insert the SCB or bypass the SCB and no abnormal voltage is determined to exist by the SDD function within the time window; and determining that the command is consistent when the command is to the other one of insert the SCB or bypass the SCB and the abnormal voltage is determined to exist by the SDD function within the time window.

Embodiment 9: The method of any one of Embodiments 5 through 8, wherein the remote control signal is received from a remedial action schemes (RAS) system, an energy management system (EMS), or a wide-area monitoring, protection, and control (WAMPAC) system.

Embodiment 10: The method of any preceding embodiment, wherein assessing whether or not the command is consistent with the physical state of the power system comprises: determining that the command is inconsistent with the physical state of the power system, when either the command is to insert the SCB and a present load of the transmission line is below a first threshold, or the command is to bypass the SCB and the present load of the transmission line exceeds a second threshold; and determining that the command is consistent with the physical state of the power system, when either the command is to insert the SCB and the present load of the transmission line exceeds the second threshold, or the command is to bypass the SCB and the present load of the transmission line is below the first threshold.

Embodiment 11: The method of any preceding embodiment, wherein assessing whether or not the command is consistent with the physical state of the power system comprises determining that the command is inconsistent with the physical state of the power system when either: the command is to insert the SCB and is received within a time window from execution of a prior command to bypass the SCB; or the command is to bypass the SCB and is received within the time window from execution of a prior command to insert the SCB.

Embodiment 12: The method of Embodiment 11, wherein the remote control signal is received from a remedial action schemes (RAS) system, an energy management system (EMS), or a wide area monitoring, protection, and control (WAMPAC) system.

Embodiment 13: The method of any preceding embodiment, further comprising using the at least one hardware processor to execute two or more of: a line fault detection (LFD) function that determines whether or not a line fault exists on the transmission line; a system disturbance detection (SDD) function that determines whether or not a system disturbance exists within the power system; or an interlocking schemes (IS) function that determines one or both of a load condition of the transmission line or whether or not a prior command has been executed within a time window preceding receipt of the remote control signal; wherein assessing whether or not the command is consistent with the physical state of the power system comprises executing logic that utilizes the determination by each of the two or more of the LFD function, the SDD function, and the IS function to determine whether or not the command is consistent with the physical state of the power system.

Embodiment 14: The method of Embodiment 13, further comprising using the at least one hardware processor to: receive real-time measurements of the power system; and execute the two or more of the LFD function, the SDD function, or the IS function in real time using the real-time measurements as input.

Embodiment 15: The method of Embodiment 14, wherein the logic completes execution within 500 milliseconds of receiving the remote control signal.

Embodiment 16: The method of any preceding embodiment, further comprising using the at least one hardware processor to: receive real-time measurements of the power system; and continually determine the physical state of the power system in real time based on the real-time measurements, wherein the assessment is performed each time a remote control signal is received.

Embodiment 17: The method of any preceding embodiment, further comprising using the at least one hardware processor to, when execution of the command is allowed, controlling a bypass breaker of the SCB station according to the command.

Embodiment 18: The method of Embodiment 17, wherein controlling the bypass breaker comprises: opening the bypass breaker when the command is to insert the SCB; and closing the bypass breaker when the command is to bypass the SCB.

Embodiment 19: A series capacitor bank (SCB) station comprising: an SCB that includes a bank of capacitors arranged in series along a transmission line within a power system; a bypass breaker; and a controller that includes software representing a local protection layer, and at least one hardware processor configured to execute the software to execute the method of any one of Embodiments 1 through 18.

Embodiment 20: A non-transitory computer-readable medium having instructions stored thereon, wherein the instructions, when executed by a processor of a series capacitor bank (SCB) station, cause the processor to execute the method of any one of Embodiments 1 through 18.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor, within a controller of a series capacitor bank (SCB) station, to:
   receive a remote control signal from a system that is external to the SCB station, wherein the remote control signal represents a command to either electrically insert the SCB into a power line within a power system or bypass the SCB;
   execute a line-fault detection (LFD) function that determines whether or not a line fault exists within a detection zone;
   assess whether or not the command is consistent with a physical state of the power system, wherein assessing whether or not the command is consistent with the physical state of the power system comprises
      determining that the command is inconsistent with the physical state of the power system when the command is to bypass the SCB and is received while no line fault is determined to exist within the detection zone by the LFD function, and
      determining that the command is consistent with the physical state of the power system when the command is to bypass the SCB and is received while the line fault is determined to exist within the detection zone by the LFD function;
   when the command is inconsistent with the physical state of the power system, block execution of the command by the controller; and,
   when the command is consistent with the physical state of the power system, allow execution of the command by the controller.

2. The method of claim 1, further comprising using the at least one hardware processor to, when the command is inconsistent with the physical state of the power system, initiate an alert to one or more recipients.

3. The method of claim 1, wherein the remote control signal is received from a line protection system.

4. The method of claim 1, further comprising using the at least one hardware processor to execute a system disturbance detection (SDD) function that determines whether or not a system disturbance exists within the power system, wherein assessing whether or not the command is consistent with the physical state of the power system comprises determining whether or not the command is consistent based on an existence or non-existence of the system disturbance, as determined by the SDD function, within a time window around receipt of the remote control signal.

5. The method of claim 4, wherein the system disturbance comprises an emergency power transfer, and wherein determining whether or not the command is consistent based on the existence or non-existence of the system disturbance comprises:
   determining that the command is inconsistent when the command is to insert the SCB and no emergency power transfer is determined to exist by the SDD function within the time window; and
   determining that the command is consistent when the command is to insert the SCB and the emergency power transfer is determined to exist by the SDD function within the time window.

6. The method of claim 4, wherein the system disturbance comprises a frequency disturbance, and wherein determining whether or not the command is consistent based on the existence or non-existence of the system disturbance comprises:
   determining that the command is inconsistent when the command is to one of insert the SCB or bypass the SCB and no frequency disturbance is determined to exist by the SDD function within the time window; and
   determining that the command is consistent when the command is to the other one of insert the SCB or bypass the SCB and the frequency disturbance is determined to exist by the SDD function within the time window.

7. The method of claim 4, wherein the system disturbance comprises an abnormal voltage, and wherein determining whether or not the command is consistent based on the existence or non-existence of the system disturbance comprises:
   determining that the command is inconsistent when the command is to one of insert the SCB or bypass the SCB and no abnormal voltage is determined to exist by the SDD function within the time window; and
   determining that the command is consistent when the command is to the other one of insert the SCB or bypass the SCB and the abnormal voltage is determined to exist by the SDD function within the time window.

8. The method of claim 4, wherein the remote control signal is received from a remedial action schemes (RAS) system, an energy management system (EMS), or a wide-area monitoring, protection, and control (WAMPAC) system.

9. The method of claim 1, wherein assessing whether or not the command is consistent with the physical state of the power system comprises:
   determining that the command is inconsistent with the physical state of the power system, when either
      the command is to insert the SCB and a present load of the transmission line is below a first threshold, or
      the command is to bypass the SCB and the present load of the transmission line exceeds a second threshold; and
   determining that the command is consistent with the physical state of the power system, when either
      the command is to insert the SCB and the present load of the transmission line exceeds the second threshold, or
      the command is to bypass the SCB and the present load of the transmission line is below the first threshold.

10. The method of claim 1, further comprising using the at least one hardware processor to execute one or more of:
   a system disturbance detection (SDD) function that determines whether or not a system disturbance exists within the power system; or
   an interlocking schemes (IS) function that determines one or both of a load condition of the transmission line or whether or not a prior command has been executed within a time window preceding receipt of the remote control signal;
   wherein assessing whether or not the command is consistent with the physical state of the power system comprises executing logic that utilizes the determination by the LFD function and each of the one or more of the SDD function and the IS function to determine whether or not the command is consistent with the physical state of the power system.

11. The method of claim 10, further comprising using the at least one hardware processor to:
   receive real-time measurements of the power system; and
   execute the LFD function and the one or more of the LFD function, the SDD function or the IS function in real time using the real-time measurements as input.

12. The method of claim 11, wherein the logic completes execution within 500 milliseconds of receiving the remote control signal.

13. The method of claim 1, further comprising using the at least one hardware processor to:
   receive real-time measurements of the power system; and
   continually determine the physical state of the power system in real time based on the real-time measurements,
   wherein the assessment is performed each time a remote control signal is received.

14. The method of claim 1, further comprising using the at least one hardware processor to, when execution of the command is allowed, controlling a bypass breaker of the SCB station according to the command.

15. The method of claim 14, wherein controlling the bypass breaker comprises:
   opening the bypass breaker when the command is to insert the SCB; and
   closing the bypass breaker when the command is to bypass the SCB.

16. A method comprising using at least one hardware processor, within a controller of a series capacitor bank (SCB) station, to:
   receive a remote control signal from a system that is external to the SCB station, wherein the remote control signal represents a command to either electrically insert the SCB into a power line within a power system or bypass the SCB;
   assess whether or not the command is consistent with a physical state of the power system, wherein assessing whether or not the command is consistent with the physical state of the power system comprises determining that the command is inconsistent with the physical state of the power system when either
      the command is to insert the SCB and is received within a time window from execution of a prior command to bypass the SCB, or
      the command is to bypass the SCB and is received within the time window from execution of a prior command to insert the SCB;
   when the command is inconsistent with the physical state of the power system, block execution of the command by the controller; and,
   when the command is consistent with the physical state of the power system, allow execution of the command by the controller.

17. The method of claim 16, wherein the remote control signal is received from a remedial action schemes (RAS) system, an energy management system (EMS), or a wide area monitoring, protection, and control (WAMPAC) system.

18. A series capacitor bank (SCB) station comprising:
   an SCB that includes a bank of capacitors arranged in series along a transmission line within a power system;
   a bypass breaker; and
   a controller that includes
      software representing a local protection layer, and
      at least one hardware processor configured to execute the software to
         receive a remote control signal from a system that is external to the SCB station, wherein the remote control signal represents a command to either electrically insert the SCB into the transmission line by opening the bypass breaker or bypass the SCB by closing the bypass breaker;
         execute a line-fault detection (LFD) function that determines whether or not a line fault exists within a detection zone,
         assess whether or not the command is consistent with a physical state of the power system, wherein assessing whether or not the command is consistent with the physical state of the power system comprises
            determining that the command is inconsistent with the physical state of the power system when the command is to bypass the SCB and is received while no line fault is determined to exist within the detection zone by the LFD function, and
            determining that the command is consistent with the physical state of the power system when the command is to bypass the SCB and is received while the line fault is determined to exist within the detection zone by the LFD function;
         when the command is inconsistent with the physical state of the power system, block execution of the command; and, when the command is consistent with the physical state of the power system, execute the command.

19. A non-transitory computer-readable medium having instructions stored thereon, wherein the instructions, when executed by a processor of a series capacitor bank (SCB) station, cause the processor to:
- receive a remote control signal from a system that is external to the SCB station, wherein the remote control signal represents a command to either electrically insert the SCB into a transmission line within a power system or bypass the SCB;
- execute a line-fault detection (LFD) function that determines whether or not a line fault exists within a detection zone;
- assess whether or not the command is consistent with a physical state of the power system, wherein assessing whether or not the command is consistent with the physical state of the power system comprises
  - determining that the command is inconsistent with the physical state of the power system when the command is to bypass the SCB and is received while no line fault is determined to exist within the detection zone by the LFD function, and
  - determining that the command is consistent with the physical state of the power system when the command is to bypass the SCB and is received while the line fault is determined to exist within the detection zone by the LFD function;
- when the command is inconsistent with the physical state of the power system, block execution of the command by the controller; and,
- when the command is consistent with the physical state of the power system, allow execution of the command by the controller.

* * * * *